W. R. WALKER.
DISH WASHER.
APPLICATION FILED MAY 31, 1911.
1,070,562.
Patented Aug. 19, 1913.
3 SHEETS—SHEET 3.
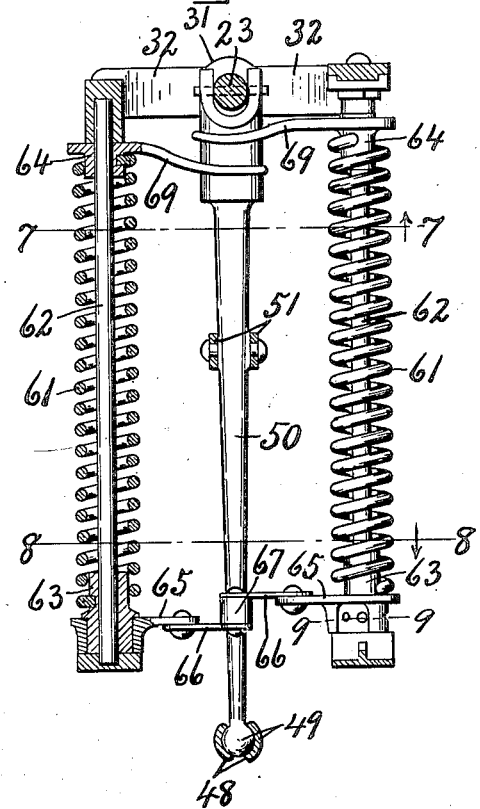
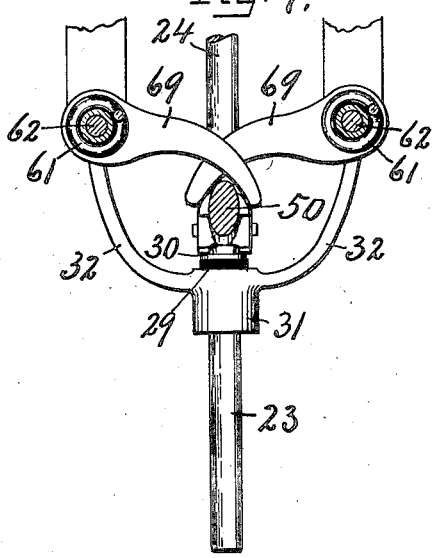
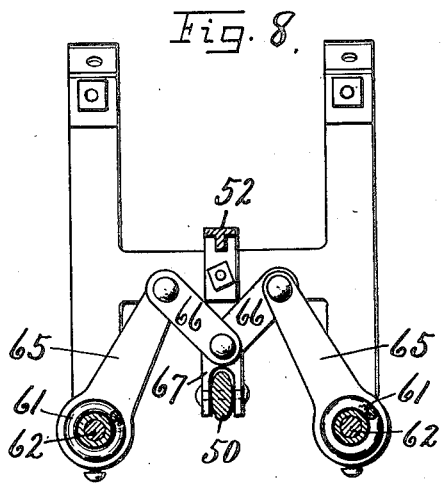
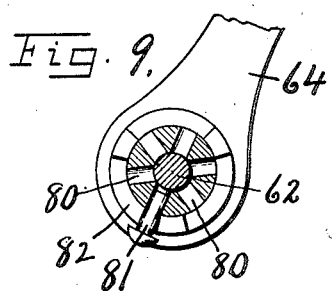
WITNESSES.
Chas. E. Skelton
H. E. Chase
INVENTOR
W. R. Walker
By Howard T. Dunbar ATT'Y.

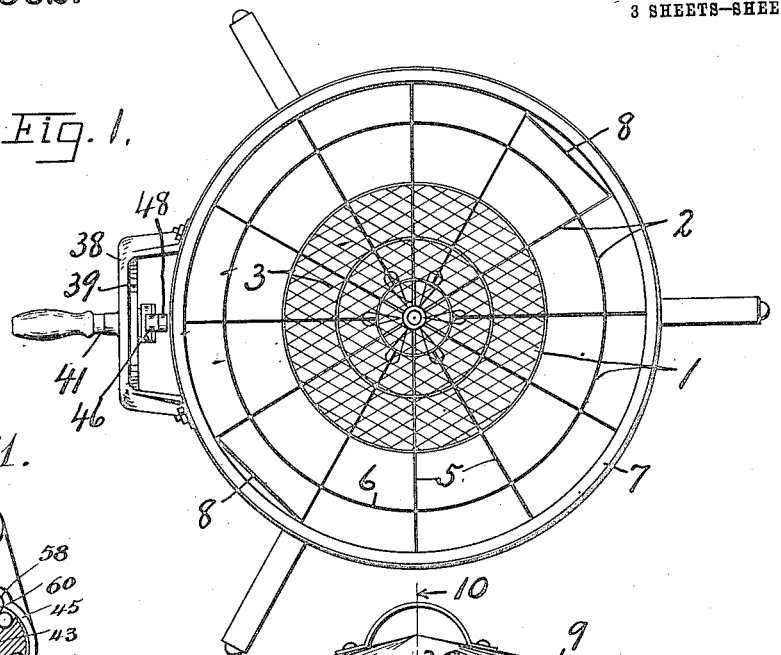
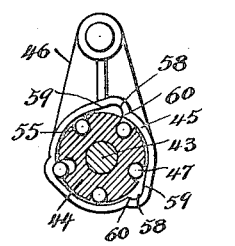
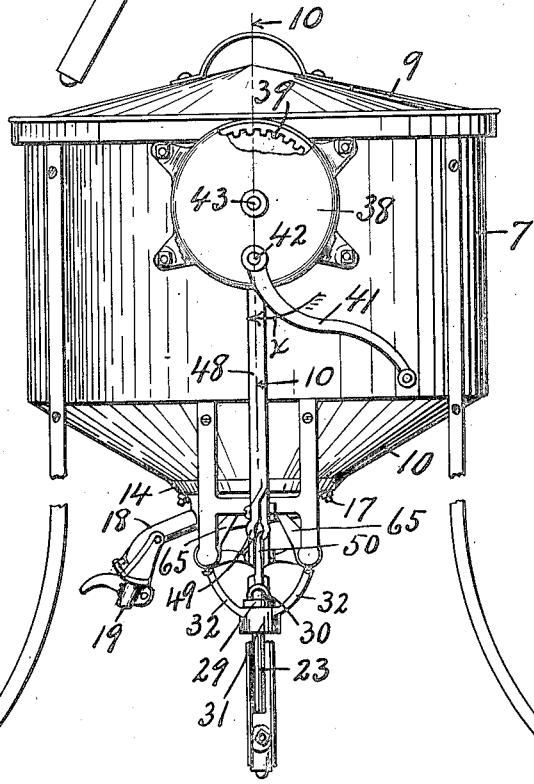

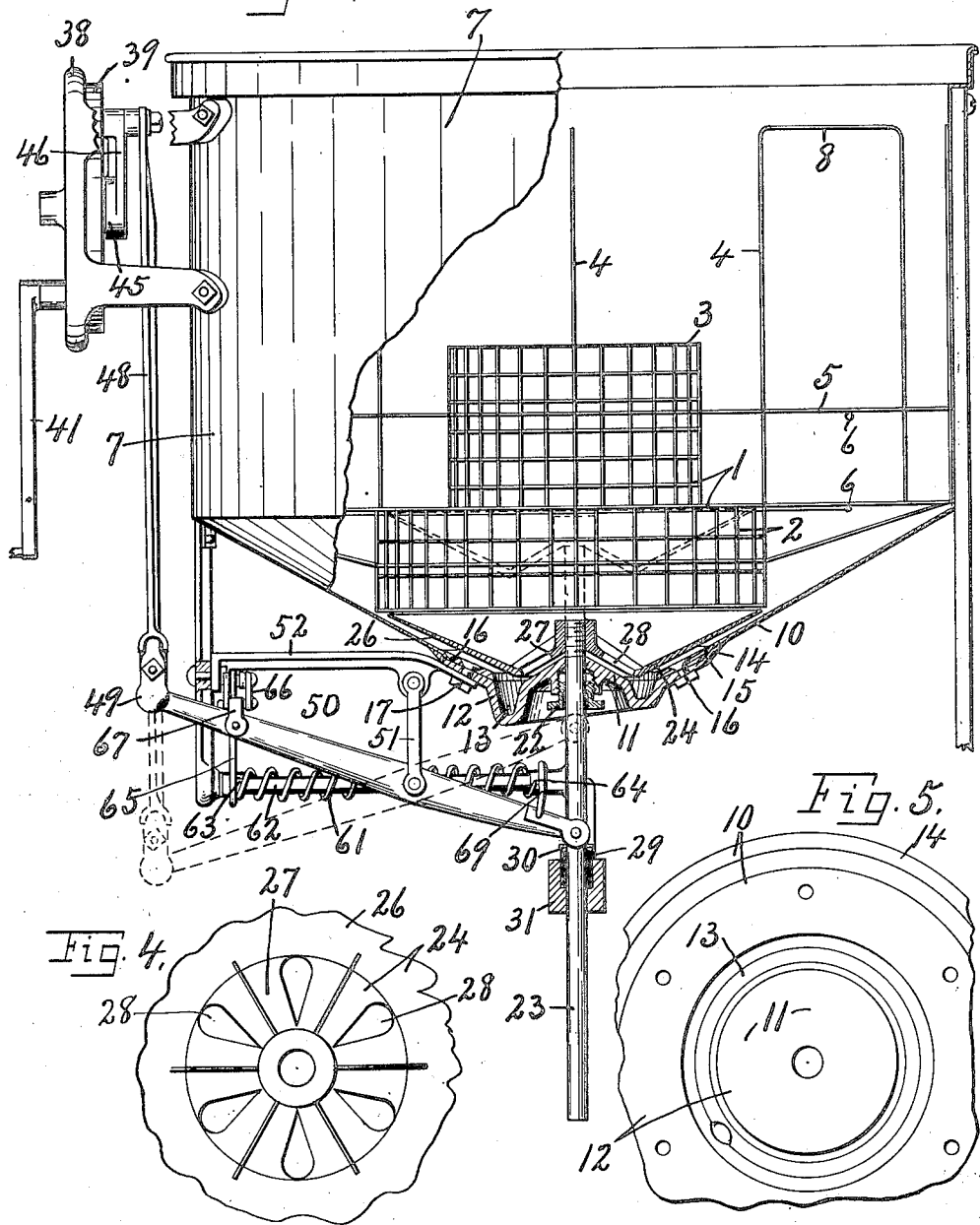

UNITED STATES PATENT OFFICE.

WILLARD R. WALKER, OF SYRACUSE, NEW YORK.

DISH-WASHER.

1,070,562.

Specification of Letters Patent. Patented Aug. 19, 1913.

Application filed May 31, 1912. Serial No. 696,280.

*To all whom it may concern:*

Be it known that I, WILLARD R. WALKER, of Syracuse, in the county of Onondaga, in the State of New York, have invented new and useful Improvements in Dish-Washers, of which the following, taken in connection with the accompanying drawings, is a full, clear, and exact description.

This invention relates to certain improvements in dish washers of the class set forth in the patents to Leonard and Hescox #607,515, July 19, 1898 and Hescox #860,804, July 23, 1907 in which the dishes to be washed are placed in or upon suitable cages or skeleton supports within a closed receptacle having an inverted conical bottom containing a limited quantity of water which is intermittingly dashed upwardly against the superposed dishes by means of a reciprocatory conical dasher coacting with the conical bottom of the receptacle.

In both of the patents mentioned, the dasher is made in the form of an inverted cone of substantially the same angle as the bottom of the receptacle with which it is adapted to coact and is provided with perforations arranged around the axis of its operating rod and through which the water is projected upwardly in jets upon the descent of the dasher by means of a spring after such dasher has been elevated through the medium of suitable hand-operated mechanism. The perforations in the portions of each of these patents are disposed at substantially right angles to the upwardly flaring sides, thereby directing the water in upwardly converging jets or toward the produced axis of the dasher while an additional quantity of water is forced by impact between the dasher and conical bottom of the receptacle upwardly and outwardly around the edges of the dasher, thus leaving a considerable intervening space where the water does not reach at least with sufficient force to effectively wash the dishes which may rest on the cages in such space.

One of the main objects of my present invention is to cause the water to be forcibly projected upwardly and outwardly from the axis of the dasher in relatively large radially elongated jets or streams so as to cover practically the whole interior area of the receptacle and thereby more effectively wash the dishes and other articles which may be supported in or upon the cage around the produced axis of the dasher. In other words I have sought to distribute the upwardly projected jets or streams of water more evenly across the entire interior area of the receptacle than is possible in the machine set forth in the patents referred to so that any dishes or other articles placed in or upon the cage will lie in the path of at least some portion of the upwardly projected streams or jets.

The force with which the jets or streams are projected upwardly from the bottom of the receptacle against the superposed dishes or other articles to be washed depends somewhat upon the rapidity and power of descent of the dasher and another object of my invention is to provide simple actuating mechanisms whereby the dasher may be elevated with a minimum degree of power and depressed after each elevation with a maximum velocity and power by a minimum degree of movement of its actuating motor as the driving element continues to rotate in the same direction.

Other objects and uses relating to specific parts of the device will be brought out in the following description.

In the drawings—Figures 1 and 2 are respectively a top plan and a front elevation of a dish washer embodying the various features of my invention, a portion of the supporting legs being broken away in Fig. 2. Fig. 3 is an enlarged transverse vertical sectional view of the main portion of the machine shown in Figs. 1 and 2 showing the dasher and its actuating mechanism in its normal position of rest, a portion of the main receptacle being shown in elevation. Fig. 4 is an enlarged top plan of a portion of the dasher. Fig. 5 is a similar plan of the central bottom plate of the receptacle. Fig. 6 is an enlarged top plan of the spring motor and adjacent portion of its tensioning mechanism. Figs. 7 and 8 are transverse sectional views through the spring motor taken respectively on lines 7—7 and 8—8, Fig. 6. Fig. 9 is an enlarged detail sectional view through the supporting head for one end of the spring motor taken on lines 9—9 Fig. 6. Fig. 10 is an enlarged vertical sectional view of the driving mechanism for elevating the dasher and tensioning the motor, taken on line 10—10 Fig. 2. Fig. 11 is an enlarged elevation partly in section of a portion of the driving mechanism shown in Fig. 10 showing particularly the clutch connection between the driving gear and crank arm taken on line 11—11 Fig. 10.

The dishes or other articles to be washed are placed at suitable intervals apart within and upon a more or less cylindrical cage —1— of open wire netting or equivalent open work material capable of permitting the water to pass readily therethrough. As shown in the drawings, this cage comprises a cylindrical base portion —2— and a coaxial superposed cylindrical dome —3—, the base portion —2— being of slightly larger diameter than that of an underlying dasher hereinafter described and open at the bottom to permit the dasher to be operated therein and is provided with a circular series of upwardly projecting guard arms —4— spaced equi-distant apart from each other and from the periphery of the dome —3— to retain plates and other dishes which may rest upon the marginal upper face of the base section —2—. The top of the base section —2— also forms the bottom of the dome —3— into which additional dishes or other articles to be washed may be placed with their lower edges resting on said bottom. The base —2— and dome portion —3— are rigidly united to each other and are provided with radially projecting arms —5— extending some distance beyond the periphery of the base —2— and rigidly connected to each other by circular rings —6—.

The entire cage is adapted to be inserted into and removed from a receptacle —7— and for this purpose is provided with diametrically opposite handles or wire loops —8— by which it may be lowered and raised into and out of the receptacle or carried from place to place as may be desired, the extreme diameter of the cage being substantially equal to the interior diameter of the receptacle which, in this instance, is cylindrical and provided with a cover —9—.

By making the cage separate from the receptacle it may be taken out and brought to the place where the dishes and other articles are collected so that the latter may be placed therein and the entire cage may then be carried to and placed within the receptacle. This receptacle is adapted to retain a quantity of water and is provided with reversely tapered conical bottom portions —10— and —11—, the portion —10— constituting the main body of the bottom with its apex lowermost, while the conical portion —11— is arranged centrally of the bottom portion —10— with its apex uppermost and preferably forms a part of a cast metal plate —12— having an annular channel —13— surrounding the conical portion —11—.

The main body of the receptacle —7— including the greater portion of the conical bottom —10— is preferably made of sheet metal with a central opening in its apex covered by the plate —12— and in order to produce a water tight joint between the metal plate and inner edges of the sheet metal bottom portion —2—, the marginal edges of said plate are provided with an upturned annular flange —14— disposed at an angle with the adjacent portion of the bottom —10— while the inner marginal edges of said bottom portion —10— are also deflected downwardly at the inside of and parallel with the flanges —14— forming an inner marginal flange —15— which is clamped firmly against the inner face of the marginal flange —14— by means of a clamping ring —16— and suitable bolts —17—. This clamping ring —16— lies upon the upper face of the plate —12— between the annular groove —13— and flange —14— and its outer edge is beveled to conform to the angle of said flange so as to firmly impinge the inner marginal edge —15— of the sheet metal bottom portion —10— between it and the plate, thereby making a more effective water tight joint than would be possible if the sheet metal were merely clamped between the flat faces of the ring —16— and plate —12—. The bottom of the channel —13— is inclined from a horizontal plane and is connected at its low point to an outlet conduit —18— having a normally closed valve —19— opened at will for withdrawing the water from the interior of the receptacle when necessary. The conical portion —11— of the plate —12— is provided with a central aperture and stuffing box or gland —22— in which is guided a vertically movable plunger rod —23— carrying at its upper end a dasher —24—. This dasher is adapted to coact with the conical portions —10— and —11— by downward impact against the water in said receptacle to force such water upwardly into and around the cage —1— in contact with the dishes or other articles thereon and for this purpose is provided with an upwardly flaring or main conical portion —26— having its apex lowermost and a central conical portion —27— having its apex uppermost, said central conical portion being provided with radially elongated slots or openings —28— spaced uniform distances apart circumferentially and adapted to register with the underlying portion —11— in the bottom of the main receptacle —7—.

The angles or flare of the conical portions —26— and —27— of the dasher are substantially the same as those of the corresponding conical portions —10— and —11— of the bottom of the receptacle —7— so as to establish a more or less close fit therewith although adapted to be held a slight distance therefrom when the dasher is held in its extreme low down position by means of a rubber buffer or shock absorber —29— coacting with a stop shoulder —30— on the plunger —23— as best seen in Fig. 7. This buffer or shock absorber is mounted in an apertured hub —31— which forms a guide for the lower end of the plunger —23— and is rigidly connected by arms —32— to the underside of the plate —12— or bottom of the receptacle —7—.

By providing the upwardly converging sides of the central cone —27— of the dasher with perforations relatively located in the manner described, it is evident that when water is present in the bottom of the receptacle and the dasher is driven downward with considerable force, the water impinged between the meeting faces of the cones —11— and —27— will be forcibly projected upwardly into and through the plates and against the dishes or other articles therein in diverging jets or upwardly and outwardly from the produced axis of the dasher, while the water between the conical portions —10— and —26— of the receptacle and dasher respectively will be also forced upwardly and outwardly through the outer portions of the cage to contact with any dishes or other articles which may be mounted therein, thereby forcibly driving the water upwardly and outwardly from the axis of the dasher through all portions of the cage and over practically the entire area of the interior of the receptacle where the dishes or other articles to be washed are placed.

The top —9— of the receptacle which is removable to permit the insertion and removal of the cage or dishes is also conical with its apex uppermost so that the water which is driven upwardly and outwardly by the downward movement of the dasher impinges against the upwardly converging sides of the cover, thereby throwing the water inwardly toward the center and allowing it to gravitate upon and across the dishes or other articles in the cage. In this manner the dishes are washed by the upward projection of the water and also by the return flow and the operation may be repeated as often as may be desired to effect a thorough cleansing of the dishes of other articles.

*Dasher operating mechanism.*—Mounted upon and secured to the front side of the receptacle —7— is a gear case —38— in which is revolubly mounted an internal gear —39— and a pinion —40—, the latter being adapted to be operated by any suitable driving power as a hand crank —41— secured to the outer end of a pinion shaft —42—. The gear —39— is rotated upon a suitable stud —43— on the gear case —38— and is provided with a clutch section —44— coacting with a companion clutch section —45— on a crank arm —46— which is loosely mounted on the stud —43— and adapted to be locked to the clutch section —44— by means of one or more rollers —47— as shown in Figs. —10— and —11—. The outer end of the crank arm —46— is connected by a link —48— and ball and socket joint —49— to one end of a lever —50— which is fulcrumed or pivotally supported upon a swinging support —51—, the latter being pivoted to a bracket —52— projecting radially from the underside of the bottom of the receptacle —7— as best seen in Fig. 3. The opposite end of the lever —50— is pivotally connected to the intermediate portion of the plunger rod —23— between the guide —31— and gland —22— for imparting reciprocatory motion to the dasher —24— in a manner presently described. The clutch section —44— preferably consists of a circular disk formed integral with the gear —39— and provided with a plurality of recesses —55— opening from its periphery and spaced a uniform distance apart circumferentially to receive a corresponding number of roller clutch members —47— of substantially the same or slightly less diameter than the recesses —55— in which they are movable. The companion clutch member —45— preferably consists of a hollow hub formed integral with the crank arm —46— and provided with a plurality of, in this instance three, eccentric recesses —58— forming tangential bearings —59— and substantially radial stop shoulders —60—.

One or more of the recesses —58— is or are located in a plane or planes below the axis of the clutch disk —44— so that as the rollers are carried to corresponding planes by the rotation of said disk, they will gravitate into said recesses —58— and thereby lock the disk to the crank arm as the disk is rotated in one direction, as for example, to the right of Fig. 11, at the same time permitting the crank arm to be rotated in the same direction independently of the disk. The object of this particular form of clutch connection is to permit the dasher to be elevated to its extreme up position by means of the hand crank —41— and intervening connections and also to permit the dasher to be returned to its starting or extreme down position with considerable force and velocity by means of spiral spring motors —61— as best seen in Figs. 3, 6, 7 and 8. These spring motors —61— are mounted in a horizontal position parallel with each other upon suitable supporting rods —62— equidistant from and at opposite sides of the lever —50— with their front and rear ends secured to suitable collars —63— and —64— which are loose upon the shafts or rods —62—. These springs are adapted to be tensioned from both ends simultaneously and gradually as the dasher is raised to its extreme up position and for this purpose the collars —63— are provided with inwardly projecting crank arms —65— both of which are connected by links —66— and a yoke —67— to the front arm of the lever —50— as shown in Fig. 8, while the rear collars —64— are provided with separate crank arms —69— having their inner ends bearing against the upper sides of the rear end of the lever —50—. In order to produce this double tensioning of the spring motor —61— by the reverse movement of opposite ends of the lever —51—, said spring motors are reversely coiled upon their respective shafts —62— so that by connecting the crank arms —64— and —69— to the lever —50— in the manner described, the springs always exert a downward pressure or pull upon the dasher —24— tending to hold it in its extreme downward position as shown in Fig. 3 thereby holding the outer or front end of the lever —50— and crank arm —46— connected thereto in their extreme upward positions as shown in Figs. 3, 10 and 11 with one or more of the rollers —47— in position to lock the gear —39— to the crank arm —46—.

The tension of the springs —61— may be adjusted at will to operate the dasher downwardly with desired velocity and force and for this purpose each of the levers —65— is mounted for independent rotary movement upon the collar —63— which is provided with a series of radial apertures —80— for receiving a pin or stud —81— which is passed through and engages one end of one or more slots or recesses —82— in the hub of each lever —65—, the slot or slots —82— being made sufficiently long to extend beyond two or more of the apertures —80— so as to permit the insertion of a suitable tool into one of the apertures —80— to hold and turn the collar —63— while the pin —81— is being withdrawn and reinserted in another aperture, whereupon such tool may be removed which permits the spring to rock the collar —63— until stopped by the engagement of the pin —81— with the end of the recesses —82—. This operation may be repeated as often as may be necessary to produce the desired tension of the springs.

It is now evident that by rotating the hand crank —41— and pinion —40— connected thereto in the direction indicated by arrow X, Fig. 2, the gear —39— and crank arm —46— will be rotated in the same direction thereby depressing the outer end of the lever —50— and elevating the dasher against the action of the retracting springs or motor —61— until the crank arm —46— has been moved from an arc of substantially 180° or to a position diametrically opposite to that shown in Figs. 10 and 11, whereupon as soon as the crank arm passes the center on the half turn, its rotary motion will be continued through the other half turn independently of the hand crank —41— and gears by means of the spring motors —61— thus depressing the dasher —24— with considerable velocity and power into the water in the bottom of the receptacle. This downward movement of the dasher and consequent impact with the water causes such water to be forced upwardly and outwardly through the cage and against the dishes or other articles therein with great velocity, thereby effectively cleansing such articles which cleansing is further aided by the gravity return of the water to the bottom of the tank, this operation being repeated as often as may be necessary to produce a thorough cleansing of the articles which may be placed within the cage.

In operation the soiled dishes are properly distributed in and upon the tray or cage either before or after the latter has been placed in the vat or water retaining receptacle and owing to the fact that it is unnecessary to handle any dishes or other articles during the washing operation, it is evident that boiling hot water may be used either in the initial or final operation of washing or cleansing the dishes and that when two or more of the washing machines are available, as, for example, in hotels and other public dining rooms where a large number of dishes are to be washed several times a day, the cages with the partially washed dishes thereon may be taken out of one machine and subjected to the action of cleaning water in another machine, whereupon the finally cleansed dishes may be left in the tray and allowed to drain dry either in the machine or by withdrawing the tray or cage therefrom and setting it one side.

The operation of the machine has now been set forth in such full, exact and clear terms as to enable any one skilled in the art to make and use the same and although I have shown a specific form of receptacle and dish supporting cage or tray, I do not wish to be limited to such forms nor to the exact details of the other mechanisms for operating the dasher.

What I claim is:

1. In a dish washing machine, a water containing receptacle having reversely tapered conical bottom portions, a reciprocatory dasher having reversely tapered conical portions conforming to those of the receptacle, and means for operating the dasher.

2. In a dish washing machine, a water containing receptacle having the central portion of its bottom conical with its apex uppermost, and a reciprocatory dasher having a conical central portion also disposed with its apex uppermost and co-acting with the conical portion of the receptacle, said conical portion of the dasher being provided with apertures through which the water is forced upwardly and outwardly by impact of the dasher therewith.

3. In a dish washing machine, a water containing receptacle, a reciprocatory dasher movable centrally therein and provided with outer and inner conical portions flaring in opposite directions, the inner conical portion being provided with apertures therethrough.

4. In a dish washing machine, a water containing receptacle having its bottom provided with a central raised portion and an annular channel surrounding said raised portion, said channel having an outlet, the raised portion being provided with a central shaft opening, a shaft in said opening and a dasher secured to the shaft within the receptacle, and means for operating the shaft.

5. In a dish washing machine, a water containing receptacle having its bottom provided with a central raised conical portion and an annular channel surrounding said raised portion, said channel being provided with an outlet, a vertically movable dasher having a central conical portion coöperating with the raised central portion of the bottom of the receptacle, and means for reciprocating the dasher.

6. In a dish washing machine, a water containing receptacle having its bottom provided with a raised central portion and an annular channel surrounding said raised portion and provided with an outlet in one side, the remaining portions of the channel declining toward the outlet, a dasher movable in the receptacle and having a raised central portion coöperating with the raised portion of the bottom of the receptacle to dash the water upwardly therethrough.

7. In a dish washing machine, a water containing receptacle having its bottom provided with a raised conical central portion and an annular channel surrounding said raised portion, the remaining portions of the bottom flaring upwardly through the outer side of the channel, said channel having an outlet in one side, a shaft movable vertically in a central aperture in the raised portion of the bottom, and a dasher secured to the upper end of the shaft within the receptacle.

8. In a dish washing machine, a water containing receptacle having reversely tapered conical bottom portions and an annular channel between said conical portions, and a reciprocatory dasher having reversely tapered conical portions conforming to those of the receptacle, and means for operating the dasher, said channel being provided with an outlet in one side.

In witness whereof I have hereunto set my hand on this 12th day of May 1911.

WILLARD R. WALKER.

Witnesses:
  H. E. CHASE,
  E. F. SPEARING.